29-243.5F
10/15/85 OR 4,546,528

United States Patent [19]
Langas

[11] Patent Number: 4,546,528
[45] Date of Patent: Oct. 15, 1985

[54] CLIP WRAPPING TOOL APPARATUS

[75] Inventor: Arthur Langas, Glenview, Ill.
[73] Assignee: Hartco Company, Skokie, Ill.

[21] Appl. No.: 586,670
[22] Filed: Mar. 6, 1984
[51] Int. Cl.⁴ ............................................ B23P 11/00
[52] U.S. Cl. ................................... 29/243.56; 227/95; 227/130
[58] Field of Search ........................ 29/243.56, 243.57; 227/95, 130; 140/53, 57

[56] References Cited

U.S. PATENT DOCUMENTS

| | | | |
|---|---|---|---|
| 3,641,656 | 2/1972 | Langas et al. | 29/243.57 |
| 4,003,118 | 1/1977 | Jensen | 29/243.56 |
| 4,037,771 | 7/1977 | Peterson | 227/130 |
| 4,224,731 | 9/1980 | Lingle | 29/243.56 |

*Primary Examiner*—James L. Jones, Jr.
*Attorney, Agent, or Firm*—Wallenstein, Wagner, Hattis, Strampel & Aubel

[57] ABSTRACT

Free standing apparatus adapted for use with a clip clinching tool capable, at high speed, of exerting a pulling force on a clip assembly whereby the clips comprising the assembly are sequentially severed and wrapped on elements of a workpiece, especially overlapping wire members employed in the manufacture of furniture, mattress innersprings, and the like, to firmly secure the wire members together. The apparatus includes a flexible track, provided with guides, along which the interconnected clips of the clip assembly are pull-fed into the clinching tool.

27 Claims, 6 Drawing Figures

CLIP WRAPPING TOOL APPARATUS

TECHNICAL FIELD

The present invention relates to apparatus adapted for use with a clinching tool capable, at high speed, of sequentially severing and wrapping U-shaped clips on elements of a workpiece, especially overlapping wire members employed in the manufacture of furniture, mattress innersprings, and the like, to firmly secure the wire members together.

BACKGROUND OF THE PRIOR ART

In U.S. Pat. No. 3,613,878, there is disclosed a clip assembly in the form of a row of U-shaped sheet metal clips. The clips are maintained in alignment with each other either by means of a pliant carrier strip which may be a plastic tape, most suitably a polyester plastic tape, the width of which is slightly less than the width of the clips, which is adhered to the clips by means of an adhesive, such as a pressure sensitive adhesive, or by means of a continuous layer of an adhesive substance per se, applied to the undulatory surfaces constituting the arched crown portions of the clips. The clip assembly of the patent is adapted to be used with a hand-held clinching tool provided with a magazine for receiving the clip assembly, and along which the clip assembly is pushed in the direction of the forming jaw of the tool by a slidable member, such as a spring biased follower, in abutting engagement with the last clip of the assembly. Exemplary of such a tool is the tool disclosed in U.S. Pat. No. 3,641,656. While the patent states that an "indeterminate" or "indefinite" number of the pliant material adhesively held U-clips can be spiraled into a coil, and that such a coil "could be extensive enough to keep an automatic clipreforming tool operating for an entire workday", in actual practice those statements proved to be merely prophetic and, in actual commercial usage in the field, the attainment of those goals was found in no way to be attainable. More specifically in this connection, with the introduction of high-speed clinching tools, whether they be of the stationary type, or robot-like in operation, wherein each clip of the clip assembly is successively pull-fed, at a rapid rate, into the forming jaw of the clinching tool, the clip assembly made in accordance with the preferred embodiment shown in U.S. Pat. No. 3,613,878 could not withstand the forces applied to it by such tools with the result that the plastic tape would peel-off the crown portion of the clips, and the clips would be easily dislodged from the clip assembly. Coil failure, therefore, regularly and inevitably occurred. As a consequence, the clip assembly made in accordance with the patent was later found, in commercial operations, to be limited to use in lengths of up to about 45 clips, and could only be used with a tool such as that disclosed in U.S. Pat. No. 3,641,656. An operator, therefore, was compelled to reload the magazine of the tool as many as five times in order to complete a single mattress innerspring, for example. Moreover, it was found that the clip assembly of the patent could not be wound, under tension, into a tight, integrated roll, in the manner of a spool of thread or wire, because the the plastic tape would peel-off the crown portions of the clips, and the clip assembly would tend to unravel and fall away from the roll, thereby creating shipping and handling problems which made the use of the clip assembly in roll form impractical and uneconomical.

In copending continuation-in-part U.S. patent application Ser. No. 586,669, filed Mar. 6, 1984, now U.S. Pat. No. 4,508,220, dated Apr. 2, 1985, an improved clip assembly is disclosed which is uniquely adapted for use in automatic clinching tools of the type employed in high-speed production line operations. The integrated, high-strength structural features of the assembly of said copending application, coupled with an optimum degree of flexibility, enable the assembly to be formed, in the manner of a spool of thread or wire, into a compact, easily handled, self-sustaining cylindrically shaped, tightly wound roll comprising at least several thousand U-shaped clips, indeed, as many as about 12,500 or somewhat more of such clips. The roll, when mounted for rotation on a rod or spindle, for example, can be pull-fed at a high rate of speed into the forming jaw of an automatic clip-clinching tool without any failure of the clip assembly or the tightly wound roll. Use of the assembly in the form of a roll comprising thousands of interconnected U-shaped clips reduces down times to a minimum thereby enhancing significantly the efficiency and the economic advantages of the overall automated operation. Thus, by way of illustration, in the manufacture of a mattress innerspring, approximately 180 to approximately 250 clips are required to be wrapped on the wire members forming each mattress innerspring. Utilizing a tape-held clip assembly of the type disclosed in U.S. Pat. No. 3,613,878, such an assembly can, as stated, only actually be used in lengths of up to about 45 clips in commercial operations. As a result, an operator of a push-feed type clip wrapping tool such as is disclosed in U.S. Pat. No. 3,641,656, capable of applying 120 clips a minute, is compelled to reload clips into the magainze of the tool at least about four or five times in order to complete a single mattress innerspring. Stated differently, an operator using the tape-held assembly of U.S. Pat. No. 3,613,878, where five reloads of clips are necessary to complete a mattress innerspring, is required to stop about 2.66 times each minute to reload the clip wrapping tool. In the case of a skilled operator, each reloading takes approximately 10 seconds. Out of each minute, therefore, approximately 26.6 seconds are lost in reloading the tool. In marked contrast to the situation with the pliant material adhered carrier strip or tape-held clips of U.S. Pat. No. 3,613,878, the present invention makes feasible, as stated, the use of a clip assembly in the form of a tightly wound roll comprising of the order of about 12,500 clips, or 277.7 times the number of clips on a 45 clip strip of the type disclosed in said U.S. Pat. No. 3,613,878. As a result, 277.7 fewer reloadings of a clip wrapping tool are required, or, in terms of time, a savings of 2777 seconds, or 46.3 minutes per roll.

BRIEF SUMMARY OF THE INVENTION

The present invention provides apparatus, and a high speed, pull-fed clinching tool have been evolved for sequentially severing and wrapping U-shaped clips from a roll of the type disclosed in said copending application comprising thousands of interconnected clips. In accordance with one aspect of the invention, the apparatus includes a support frame having a base portion for maintaining the frame in an upright position in proximity to a workpiece such as a mattress innerspring. A vertical bar member or standard, having an outwardly extending horizontal top bar or arm, is secured to the support frame. Adjustable carriage means or clip roll dispenser means for supporting a roll of interconnected clips, such as the roll described in said copending application, advantageously is suspended from the horizontal arm of the standard, and is adapted to be moved between a first, elevated position and a second, lowered position with relation to a workpiece and an operator by counterweight means supported on the support frame of the apparatus. Flexible track means is associated with the clip roll dispenser means for guiding the interconnected clips from the roll supported on the clip roll dispenser means to a pull-fed clip clinching tool which is adapted to be manipulated and activated by one hand of an operator. By enabling the roll of interconnected clips to be maintained in an elevated position both with respect to a workpiece and the operator of the clinching tool, the apparatus permits the tool and the flexible track means to be turned in an any direction by an operator while at the same time allowing the operator to easily and readily move the clinching tool in any direction required to wrap a clip on the wire members of a workpiece without interrupting the travel of the interconnected clips from the roll to the tool. The apparatus is constructed to withstand the rigors and hard use encountered in a high-speed, high production manufacturing operation. It takes up minimal floor space, and, despite its essentially all-metal construction, the apparatus has a weight and compactness such that it can be moved, if desired, by an operator to orient it in any convenient position with relation to a workpiece.

The clip clinching tool adapted to be used with the clip roll supporting apparatus incorporates a unique, positive acting, highly efficient, yet uncomplicated pull-feed mechanism which applies a pulling force on the clip assembly sufficient to unwind the assembly from the tightly wound roll, and sequentially move the clips in the direction of the reciprocatable blade and anvil of the clip clinching tool.

DETAILED DESCRIPTION OF THE INVENTION

Figures 1, 2, 3:
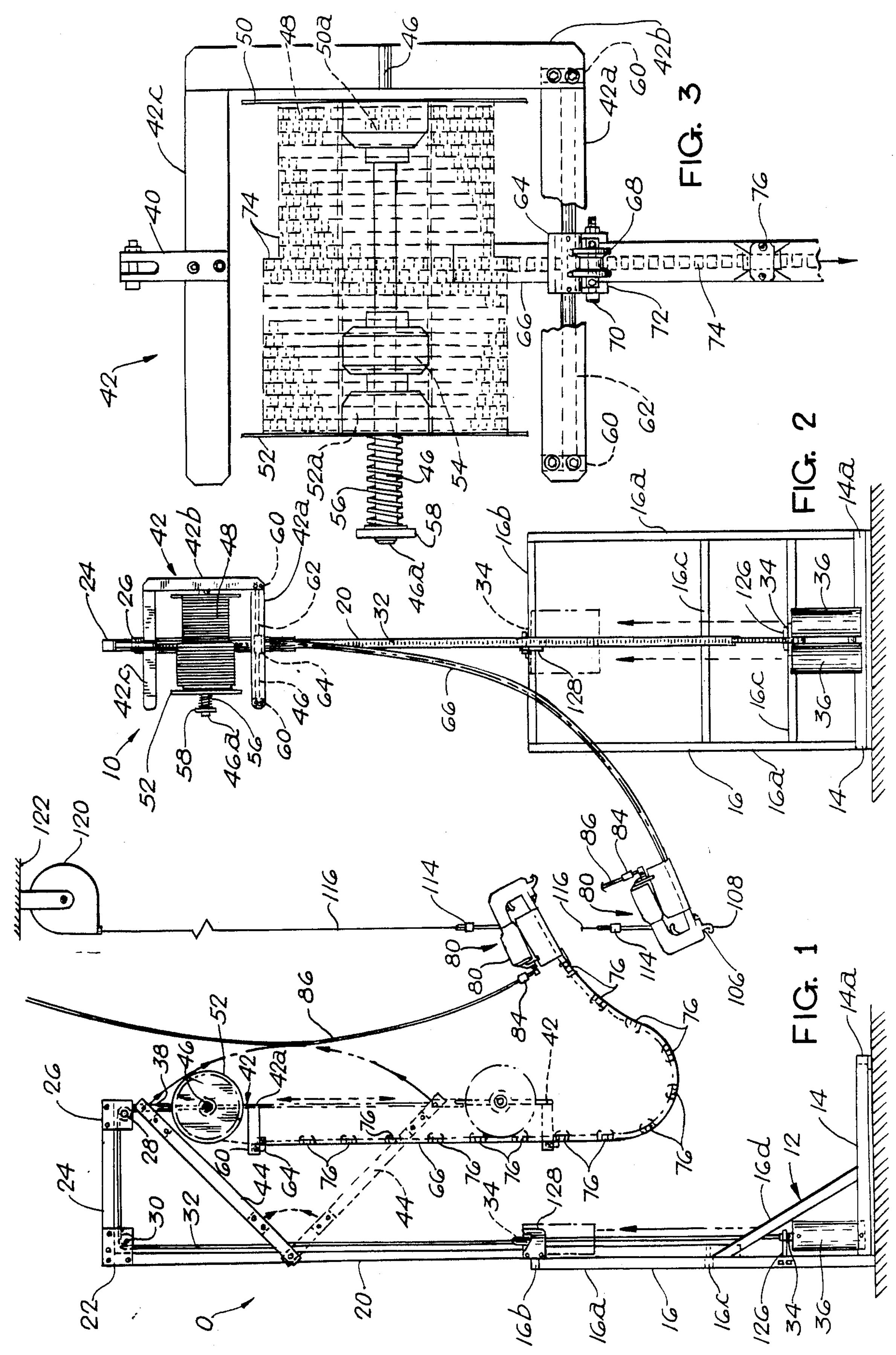
FIG. 1 is a side view in elevation of an embodiment of the apparatus of the present invention.
FIG. 2 is a front view in elevation of said apparatus.
FIG. 3 is a fragmentary front view in elevation of the clip roll dispensing means of said apparatus with a roll of interconnected clips, shown in outline form, mounted thereon.

The embodiment of the apparatus shown in FIGS. 1 and 2, and designated generally by reference numeral 10, includes a support stand 12 having a generally rectangular base portion 14 to one side of whicn is secured a generally rectangular, upright, substantially vertical portion 16. The base portion 14 of the stand 12, in the embodiment illustrated, desirably is formed of four lengths of steel bar stock 14*a* which are joined at their ends, as by welding. The vertical portion 16 of the stand 12, as shown, is formed of a pair of upright members 16*a*—16*a*, and an upper, horizontal member 16*b* which is joined at its ends to the upper ends of the upright members 16*a*—16*a*. The lower ends of the upright members 16*a*—16*a* are joined to the ends of the rearwardmost length of bar stock 14*a* forming the base portion 14 of the stand 12. Horizontally disposed reinforcing members 16*c*—16*c* advantageously are joined at their ends to the upright members 16*a*—16*a* in spaced apart relation to one another. Reinforcing braces 16*d*—16*d* desirably are joined to the members 16*a*—16*a* and the sides of the base portion 14.

An elongated standard or vertical bar member 20 is secured, as by screws, to the approximate midway point of the horizontal member 16*b* and the uppermost of the reinforcing members 16*c*—16*c*. The upper end of the vertical bar member 20 is joined, as by gusset 22, to a horizontally disposed top bar or arm 24. A bracket 26 is secured to the outer end of the arm 24. The bracket 26 serves as a support for a sprocket wheel assembly 28 which, in cooperation with a similar assembly 30 mounted for rotation on the gusset 22, guides a chain 32 along the lower side of the arm 24 and the inner side of the vertical bar member 20. While, for purposes of illustration, a chain is used in the embodiment of the apparatus described, it should be understood that a cable or wire could be employed. One end of the chain 32 is attached to a bracket 34 secured to the upper ends of a pair of counterweights 36—36. The other end of the chain 32 is pivotably attached through a chain link member 38 to a yoke member 40 which is secured to an adjustable carriage or clip roll dispenser 42 (See FIG. 4).

A pivot arm 44 is pivotably attached at one of its ends to the chain link 38 and at its other end to the standard or vertical bar member 20. The function of the pivot arm 44 will become clear as the description proceeds.

The dispenser 42, as shown, comprises an open ended metal frame having a bottom bar member 42*a*, a side bar member 42*b* and a top bar member 42*c*. The top bar member 42*c* carries the yoke member 40 which is attached to the chain link member 38. The side bar member 42*b* of the dispenser 42 carries a horizontally disposed rod or spindle 46 having a length such that the free end 46*a* thereof extends beyond the free ends of the members 42*a* and 42*c* of the dispenser. The rod or spindle 46 is adapted to receive a tightly wound roll 48 of interconnected clips. The roll 48 is supported for rotation on the dispenser 42 by an inner end plate or disc 50 and an outer end plate or disc 52 which are carried on the spindle 46. Each of the discs 50 and 52 has a roll core engaging member 50*a* and 52*a*, respectively. An auxilliary roll core engaging member 54 is also carried on the spindle 46, inwardly of the member 52*a* of the outermost disc 52, to provide added support for the roll 48. As best illustrated in FIG. 3, the free end of the spindle 46 is adapted to receive a compression spring 56 which is held in a biased condition against the outer side of the disc 52 by means of a stop pin 58 which extends through a transverse bore provided in the free end 46*a* of the spindle 46.

Tne bottom bar member 42*a* of the dispenser 42 has a rearwardly extending bracket 60 secured to each end thereof. The brackets 60—60 support a guide rod 62 on which is mounted a movable track carriage 64 to which is secured an end of a flexible clip track 66. In the embodiment of the apparatus illustrated, the clip track 66 is fabricated of an elongated, flexible strip of spring steel about 1 to 1½, preferably about 1¼ inches in width. The thickness of the steel strip can range from about 0.015 to about 0.025, preferably about 0.020 inch. A track roller 68, rotably mounted by a bolt 70 on a bracket 72 attached to the carriage 64, is provided for initially guiding the free end of the interconnected clips 74 from the roll 48 onto the clip track 66 (See FIG. 3). The track carriage 64 moves in both directions along the horizontally disposed guide rod 62 as the interconnected clips 74 are unwound from the roll 48, and acts to always keep the clips 74 and the clip track 66 in proper alignment with relation to each other. A plurality of clip guide members 76 are secured along the clip track 66 at spaced intervals to maintain the interconnected clips 74 in proper alignment with the clip track. As best illustrated in FIG. 1, the clip guide members 76 are positioned along the track 66 at relatively closely spaced intervals in order to prevent the end of the interconnected clips 74 from leaving, or falling away from, the clip track 66 after the clips 74 have been completely unwound from the clip roll 48. The continuity of the clip severing and wrapping operation thereby is not in any way disrupted.

The other end of the clip track 66 is secured to a bracket 78 attached to the clip clinching tool 80 of the present invention. The tool 80, as shown, comprises a housing 82 to which is secured a coupling 84 for attaching a flexible air hose 86 connected to a source (not shown) of pressurized air. The housing 82 includes a cylinder portion 82*a*, a handle portion 82*b*, a power transmission portion 82*c*, a clip assembly advancing portion 82*d*, and a clip severing and wrapping portion 82*e*. The general configuration of the portions 82*a*, 82*b*, 82*c* and 82*e* of the tool 80 is similar to the corresponding portions of the clip-applying tool disclosed in said U.S. Pat. No. 3,641,656. In addition, the arrangement of the cylinder and piston, the pressurized air-actuated valving, and the power train, including a thrust linkage connected to a reciprocatable blade for sequentially severing and wrapping clips on the wire members of a workpiece, of the tool 80 of the present invention are the equivalent of the corresponding arrangement of the tool disclosed in said patent. To the extent, therefore, that the tool 80 shares with the tool of the patent the aforementioned equivalent features, the teaching of the patent with respect thereto is incorporated herein by reference.

The tool of the present invention, in marked contrast to the tool shown in said patent, incorporates a unique pull-feed mechanism which includes clip guide means such as a magazine 88 into which the interconnected clips 74, of the clip assembly, travelling along the clip track 66 are pull-fed. The mechanism also includes a cylinder 90 positioned in a chamber 90*a*, and a piston 92, an end of which is slidably mounted in the cylinder 90. The piston 92 is linked to a pivotable crank member 94 which carries a spring biased, pivotable pawl. The crank member 94 is connected to a rod 98 having a compression spring 100 mounted thereon. A pair of pivotably mounted, toothed anti-backup wheels 102 and 104 are positioned above the magazine 88 in spaced relation to one another to prevent the interconnected clips 74 being sequentially pulled along the magazine 88 from moving in a rearward direction. More specifically in this connection, the multiple teeth of the wheels 102 and 104 will always be in a position to engage the clips 74 in a manner to prevent back-up of the clip assembly. The rearwardmost wheel 104 serves also to maintain the end of the interconnected clips 74, after they have been completely unwound from the roll 48, in a flattened, horizontal position in the magazine 88 thereby preventing said end of the clip assembly from flipping upwardly. The free end of the next roll of clips mounted on the dispenser 42 can then be fed into the magazine 88 from the clip track 66 without disruption of the clip severing and wrapping operation. The tool 80, like the tool shown in U.S. Pat. No. 3,641,656, is provided with a trigger 106 which moves a valve lever 108 for releasing air under pressure into the chamber for the main cylinder positioned in the cylinder portion 82*a* of the tool. Also like the tool of said patent, the tool 80 of the present invention has a reciprocatable blade or plunger 110 for severing each clip from the line of interconnected clips 74. An anvil or forming jaw 112 is provided for cradling the wire members of a workpiece to be wrapped by the severed clips.

Figure 5:
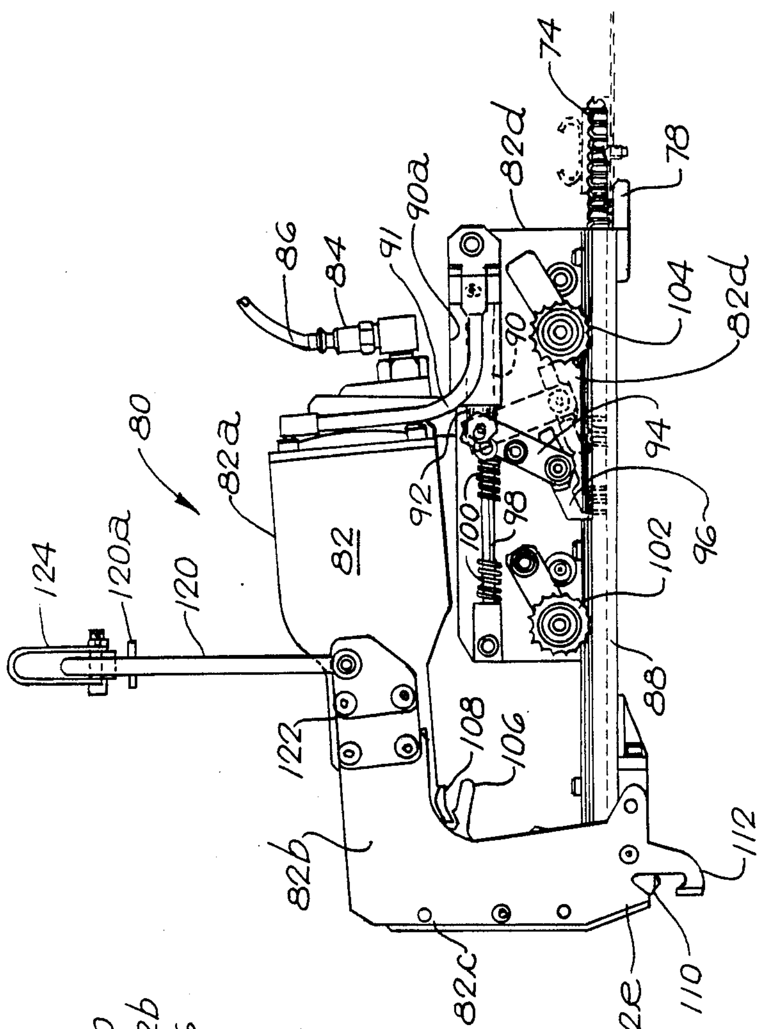
FIG. 5 is a side view in elevation of an embodiment of the clip clinching tool of the present invention used to sequentially sever and wrap clips on the wire members of a workpiece.

In operation, the pull-feed mechanism of the tool 80 is actuated by depressing the trigger 106 which, in turn, depresses the valve lever 108. Air under pressure passes into the chamber to the main cylinder and into the chamber 90*a* for the cylinder 90. An air passageway 91 is in communication with both chambers. The pressurized air channeled to the chamber 90*a* drives the piston 92 forwardly, causing the crank member 94 to pivot in a counterclockwise direction and the pivotable pawl 96 to swing clear of the clips 74 in the magazine 88 thereby re-cocking the pawl 96 as shown in broken lines in FIG. 5. Air in the chamber 90*a* is then vented to atmosphere through the chamber in which the main cylinder is positioned. The compression spring 100 on the rod 98 then exerts a force on the crank member 94 which acts to pivot the pawl 96 into engagement with clip assembly in the magazine 88 with the result that the pawl 96 applies a pulling force on the assembly. The pulling force thusly applied by the pawl 96 moves the next clip in line at the end of the assembly into position to be severed by the blade or plunger 110.

A hanger 120 advantageously is attached to the housing 82 of the tool 80 by means of a suspension bracket 122. The hanger 120 is supported on a linkage member 124 attached to an end of a cable 126 extending from a balancer 130 suspended from support means such as a structural member 132 located near and preferably above the apparatus 10. The balancer 130 desirably has a retractable spring type mechanism to enable an operator to position the tool 80 in a manner to support, in part, the weight of the tool during use, and to enable the operator to suspend the tool away from the workpiece during replacement of a roll of clips on the dispenser 42, or during periods of non-use. The end of the hanger 120 has a stop means such as a washer 120*a* secured thereto to prevent the linkage member 124 from being inadvertently disengaged from the hanger 120.

Figure 4:
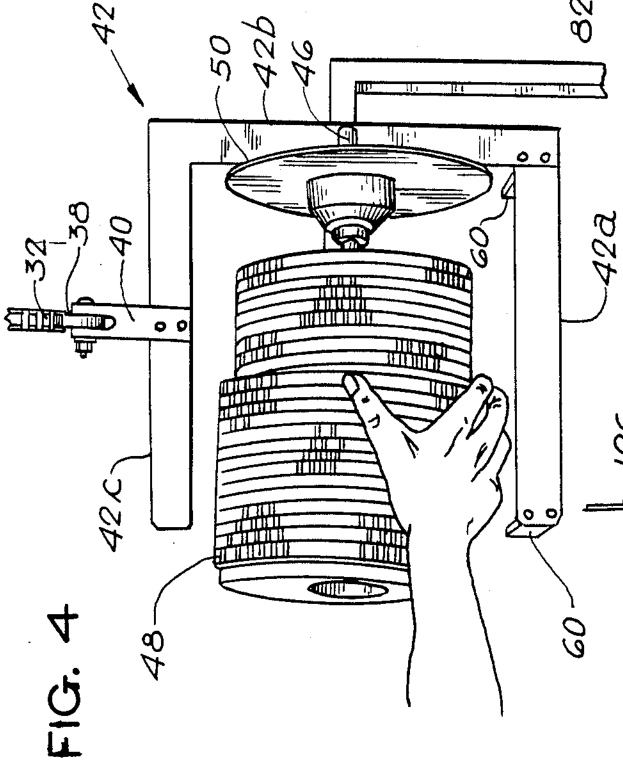
FIG. 4 is a fragmentary view in perspective showing a roll of clips being mounted on the clip roll dispensing means of the apparatus.

In utilizing the apparatus of the present invention in the manufacture of mattress innerspring 140 (see FIG. 6), for example, an operator first secures a roll 48 of interconnected clips 74 on the dispenser 42 of the apparatus. As shown in FIGS. 1, 2 and 4, this is achieved by raising the counterweights 36—36 by releasing them from their normal, lower position as shown in solid lines in FIGS. 1 and 2. In the embodiment of the apparatus illustrated, the counterweights 36—36 may be maintained in their lower position by any convenient means such as a swing latch 126 pivotably secured to the lower of the reinforcing members 16*c*—16*c* of the vertical portion 16 of the stand 12. The released counterweights 36—36 are then moved upwardly by the operator to a point adjacent to the upper horizontal member 16*b* of the stand 12 where the counterweights 36—36 are suspended from a hook or hanger 144 attached to one side of the lower end of the vertical bar member 20. Raising of the counterweights 36—36 to a suspended position on the hanger 144 acts to lower the dispenser 42, which is attached to the other end of the chain 32, to the height shown in broken lines in FIGS. 1 and 2. At this level, the spindle 46 of the dispenser 42 is about chest high to an operator, and, as shown in FIG. 4, enables the operator to position a roll 48 of the clips 74 on the spindle 46 with minimum effort, and to releasably lock it in place with the outer disc 52, the spring 56, and the pin 58. After the roll 48 has been secured on the dispenser 42, the operator moves the counterweights 36—36 to their lower position where they are secured by the latch 142. During the lowering and raising of the dispenser 42, the movement of the dispenser 42 is stabilized and controlled by tne pivot arm 44.

Figure 6:
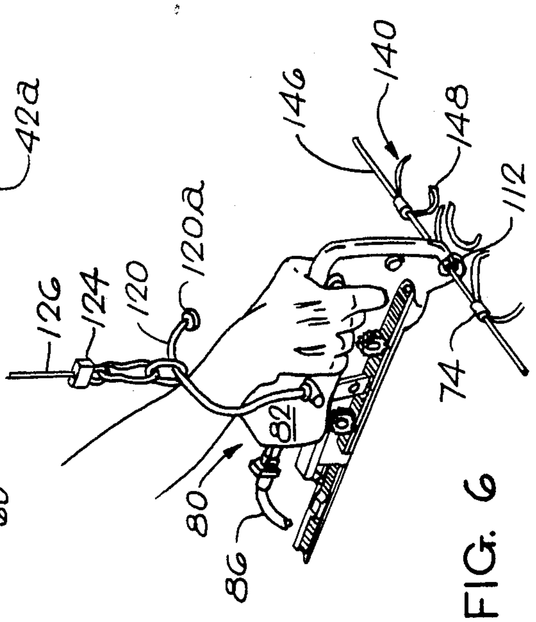
FIG. 6 is a fragmentary view in perspective showing the manner in which the interconnected clips are wrapped on a workpiece by an operator utilizing the apparatus and the clinching tool of the present invention.

When the dispenser 42 is in its upper position, the free end of the interconnected clips 74 from the roll 48 is manually guided onto the clip track 66, and into the magazine 88 of the tool 80. The tool 80 is then placed in operation by an operator as shown in FIG. 6. The tool 80, due in the main to the suspended flexible clip track 66, the flexible air hose 86, and the weight supporting action of the balancer 130 and its associated cable 126, not only has excellent manuverability, but, also, can be operated for an extended period of time without tiring an operator. The clips 74 which make up the roll 48 advantageously correspond in construction to the clips disclosed in said aforementioned continuation-in-part application. The clips 74, like the clips comprising the clip assembly of said application, are in the form of a row, and are maintained in aligned relationship to one another by resilient interconnecting means intimately bonded in point contact to each of the clips comprising the assembly. The interconnecting means advantageously comprises a pair of small diameter, flexible, low-carbon steel wires which are positioned in spaced relation to one another in point, substantially tangential contact with the outer surface of the crown or head portion of each of the clips comprising the assembly, and are intimately bonded, as by spot welding to form a metal-to-metal bond with the crown or head portion of each of the clips. The wires thusly secured to the clips provide severable, clip spanning portions which freely extend between each bonded contact point along the length of the clip assembly thereby enabling the clips to be sequentially severed and wrapped by a clinching tool on overlapping wire members 146 and 148 (See FIG. 6) of the type used in the manufacture of a mattress innerspring 140, for example. The clip spanning portions of the interconnecting means also serve to impart a flexibility to the clip assembly which enables the assembly to be oscillatingly rolled, in the manner of a spool of thread or wire, into a tight compact cylindrically shaped, self-sustaining roll, such as the roll 48, of desired dimensions without in any way disrupting the structural integrity of the clip assembly.

The superior structural strength of the clip assembly permits each clip of the assembly to be sequentially drawn, or pulled, from the roll 48 by the high-speed clinching tool 80 into a position where the reciprocatable blade 110 and the anvil 112 can wrap the clips on wire members such as the members 146 and 148 of a mattress innerspring 140. Furthermore, the integral, high strength, all metal constuction of the clip assembly per se, and the integrated, selfsustaining character of a roll formed from the assembly, act to resist any forces encountered during handling or use which may have an adverse affect on the structural integrity of the assembly and/or the roll 48 formed from it. The assembly in roll form can be stored for prolonged periods under substantially any normally encountered temperature and humidity conditions without deterioration.

While for purposes of illustration, a preferred embodiment of the present invention has been disclosed, other embodiments and modifications thereof may become apparent to those skilled in the art, and, accordingly, the present invention is to be limited only by the scope of the appended claims.

What is claimed is:

1. Apparatus for use with a clinching tool capable at high speeds of sequentially severing and wrapping clips on overlying wire members employed in the manufacture of furniture, mattress innersprings, and the like, to secure the wire members together, comprising: a plurality of interconnected clips oscillatingly wound into the form of a convoluted, elongated, cylindrically shaped roll; support means for said roll, said support means including horizontally disposed roll retaining means for enabling the interconnected clips to be oscillatingly unwound from the roll; and flexible clip guide means for guiding the interconnected clips as they are oscillatingly unwound from the roll to a pull-fed clinching tool capable at high speeds of sequentially severing and wrapping the clips on the overlying wire members of the workpiece.

2. Apparatus according to claim 1 wherein the support means includes a free standing frame member having a horizontal base portion and an upwardly extending bar support portion; and a bar member extending upwardly from the bar support portion of the frame member, said bar member having an outwardly extending support arm from which said roll is suspended.

3. Apparatus according to claim 1 wherein the support means includes adjustable roll retaining means for enabling the roll to be moved to a first, operative position and to a second, clip loading position.

4. Apparatus according to claim 3 wherein the adjustable roll retaining means includes an open-ended frame member having roll mounting means for enabling the interconnected clips to be unwound from the roll in response to the sequential severing and clip wrapping action of the clinching tool.

5. Apparatus according to claims 2 or 3 wherein a pivotable guide arm is connected at one of its ends to the bar member and at its other end to the adjustable roll retaining means, said guide arm being pivotable a distance sufficient to enable the roll to be moved to its said one position and its said second position.

6. Apparatus according to claim 1 wherein the clip guide means includes flexible track means extending from the roll retaining means to the clinching tool.

7. Apparatus according to claim 6 wherein the flexible track means is provided with a plurality of spaced guide members for maintaining the interconnected clips on the track means.

8. Apparatus according to claim 4 wherein the open-ended frame member is provided with guide rod means and movable carriage means for maintaining the interconnected clips in proper alignment with the roll as the clips are unwound therefrom.

9. Apparatus according to claim 4 wherein the roll mounting means includes a spindle on which the roll is mounted for rotation.

10. Apparatus according to claim 9 wherein tne roll is maintained on the spindle by end cap means carried on the spindle and between which the roll is secured on the spindle.

11. Apparatus according to claim 3 wherein the adjustable roll retaining means is connected to one end of guided, flexible interlinking means, the other end of said interlinking means being connected to means for raising and lowering the adjustable roll retaining means in a substantially vertical plane.

12. Apparatus according to claim 11 wherein the interlinxing means comprises a chain or cable.

13. Apparatus according to claim 11 wherein said means for raising and lowering the adjustable roll retaining means includes at least one weighted member the weight of which is less than or equal to said roll retaining means and said roll.

14. Apparatus according to claim 13 wherein the weighted member is a counterweight.

15. Apparatus according to claim 10 wherein spring means is provided for the spindle for engaging one of the end caps on the spindle.

16. Apparatus adapted for use with a clinching tool capable at high speeds of sequentially severing and wrapping U-shaped clips on overlying wire members employed in the manufacture of furniture, mattress innersprings, and the like, to secure the wire members together, comprising: a self-supporting frame having a base portion and an upright portion joined to one side of the base portion; a standard carried on the frame, said standard having an outwardly extending arm at the upper end thereof; adjustable carriage means suspended from said arm of the standard and adapted to be moved to a first, operating position with relation to a workpiece and to a second, clip loading position with relation to a workpiece; a roll formed of convolutions of aligned interconnected U-clips rotatably supported on said adjustable carriage means; flexible, clip track means extending from said carriage means to a clinching tool for sequentially severing and wrapping the interconnected U-clips fed to the tool from said roll, said clip track means serving to guide the interconnected clips from the roll to the tool; and carriage adjusting means extending from said self-supporting frame to the carriage means for enabling the carriage means and the roll supported thereon to be raised to an upper operable position and to a lower clip loading position.

17. Apparatus according to claim 16 wherein the carriage means includes an open-ended framework provided with roll engaging means for enabling the roll to be rotatably mounted on the carriage means.

18. Apparatus according to claim 16 wherein the carriage means has movable guide means thereon for properly orienting the interconnected clips with relation to the clip track means as the interconnected clips are unwound from the roll.

19. Apparatus according to claim 16 wherein the carriage adjusting means includes at least one counterweight linked to the carriage means by a flexible chain or cable.

20. Apparatus according to claim 19 wherein retaining means are provided for releasably maintaining the said at least one counterweight in a fixed position when the carriage means is in either of its said first and second positions.

21. Apparatus according to claim 16 wherein pivotable arm means extends between the standard and the carriage means for maintaining the carriage means in a substantially vertical plane as the carriage means is moved between its said first and second positions.

22. In a clip-clinching tool having a cylinder, a pressurized air actuated piston slidably mounted in the cylinder, a thrust link for translating the movement of the piston to a reciprocatable plunger for sequentially severing clips from a clip assembly, an anvil which cooperates with said plunger for wrapping a clip on the wire members of a workpiece, and trigger means, including a valve lever for releasing air under pressure for actuating said piston, the improvement comprising: clip guide means along which interconnected clips of a clip assembly are pull-fed in the direction of the reciprocatable plunger of the tool; clip engaging means movable from a first, rearward clip feeding position for sequentially applying a pulling force on the clips of the clip assembly to advance the clips along said clip guide means, and to a second, forward clip forming position; pressurized air-actuated piston means for moving the clip engaging means to its said second position; and self-activating means for moving the clip engaging means to its said first position whereby the clips are pulled along the clip guide means in the direction of the reciprocatable plunger of the tool.

23. A clip-clinching tool according to claim 22 wherein the clip guide means is a horizontally disposed magazine secured to the tool for receiving an end of a clip assembly in the form of a tightly wound roll.

24. A clip-clinching tool according to claim 22 wherein the clip engaging means includes a pivotable pawl.

25. A clip-clinching tool according to claim 22 wherein the self-actuating means includes a spring mounted on a rod connected to said piston means for pivoting the clip engaging means to its said first position.

26. A clip-clinching tool according to claim 22 wherein anti-backup means is provided for preventing the interconnected clips in the clip guide means from moving in a direction away from the reciprocatable plunger.

27. A clip-clinching tool according to claim 26 wherein the anti-backup means comprises a pair of toothed wheels which are positioned in spaced apart relation and engage the clips of the clip assembly as the interconnected clips are advanced along the clip guide means.

* * * * *